(12) United States Patent
Periyalwar et al.

(10) Patent No.: US 8,520,569 B2
(45) Date of Patent: Aug. 27, 2013

(54) COVERAGE IMPROVEMENT IN WIRELESS SYSTEMS WITH FIXED INFRASTRUCTURE BASED RELAYS

(75) Inventors: Shalini Periyalwar, Nepean (CA); Shiquan Wu, Nepean (CA)

(73) Assignee: Rockstar Consortium US LP, Plano, TX (US)

( * ) Notice: Subject to any disclaimer, the term of this patent is extended or adjusted under 35 U.S.C. 154(b) by 706 days.

(21) Appl. No.: 12/119,817

(22) Filed: May 13, 2008

(65) Prior Publication Data

US 2008/0279135 A1  Nov. 13, 2008

Related U.S. Application Data

(62) Division of application No. 11/242,029, filed on Oct. 4, 2005, now Pat. No. 7,406,060.

(60) Provisional application No. 60/696,996, filed on Jul. 6, 2005.

(51) Int. Cl.
  *H04B 7/00* (2006.01)
(52) U.S. Cl.
  USPC .......................................... 370/310
(58) Field of Classification Search
  None
  See application file for complete search history.

(56) References Cited

U.S. PATENT DOCUMENTS

| | | | |
|---|---|---|---|
| 7,428,268 B2 * | 9/2008 | Shen et al. | 375/267 |
| 7,526,038 B2 * | 4/2009 | McNamara | 375/267 |
| 7,720,020 B2 * | 5/2010 | Larsson | 370/315 |
| 7,746,886 B2 * | 6/2010 | Hansen et al. | 370/437 |
| 2003/0236069 A1 | 12/2003 | Sakata et al. | |
| 2004/0114618 A1 | 6/2004 | Tong et al. | |
| 2004/0132496 A1 | 7/2004 | Kim et al. | |
| 2005/0015511 A1 * | 1/2005 | Izmailov et al. | 709/238 |
| 2005/0265225 A1 | 12/2005 | Mahadevappa et al. | |
| 2006/0045199 A1 | 3/2006 | Kim | |
| 2006/0120477 A1 * | 6/2006 | Shen et al. | 375/267 |
| 2007/0010237 A1 * | 1/2007 | Jones et al. | 455/422.1 |

FOREIGN PATENT DOCUMENTS

| | | |
|---|---|---|
| EP | 1471678 | 4/2004 |
| WO | WO 2005/109723 | 11/2005 |

OTHER PUBLICATIONS

A. Forenza et al., "Adaptive MIMO Transmission Scheme: Exploiting the Spatial Selectivity of Wireless Channels", 2005 IEEE 61st, May 30-Jun. 1, 2005.
Korean Office Action, including English translation, issued on Oct. 30, 2012 for corresponding Korean Patent Application No. 10-2008-7003248, 9 pages.

* cited by examiner

*Primary Examiner* — Fan Ng

(57) ABSTRACT

Infrastructure relays are used to relay signals to multi-antenna receivers where the received signals are then processed using MIMO processing. The transmissions can use spatial multiplexing and/or space time block coding.

20 Claims, 15 Drawing Sheets

COVERAGE IMPROVEMENT IN WIRELESS SYSTEMS WITH FIXED INFRASTRUCTURE BASED RELAYS

RELATED APPLICATION

This application is a divisional application of U.S. patent application Ser. No. 11/242,029 filed Oct. 4, 2005, now U.S. Pat. No. 7,406,060 which claims the benefit of U.S. Provisional Patent Application No. 60/696,996 filed Jul. 6, 2005, which is hereby incorporated by reference in its entirety.

FIELD OF THE INVENTION

The invention relates to wireless systems such as cellular systems that have fixed infrastructure-based relays, and to methods of improving the coverage in such systems.

BACKGROUND OF THE INVENTION

Relays have been used to expand the coverage of conventional cellular systems. With such relays, a mobile station that is out of range of the base station may still be able to communicate with a base station via one of the relays. The relay has very little functionality, typically only re-transmitting signals received from the mobile station or from the base station.

MIMO (multiple input multiple output) systems feature multiple antennas at the transmitter and/or receiver, and spatial processing at the receiver to recover transmitted data. Examples of existing MIMO technologies include STBC (space-time block coding) and spatial multiplexing (SM) approaches.

With STBC (space-time block coding), each antenna transmits a respective stream, and there is some correlation between the streams, either due to coding and modulation of input data prior to block coding, or in the block coding structure per se. STBC schemes involve a little more complexity at the transmitter, but may allow simplified receiver complexity. An example of an STBC scheme that relies on coding and modulation prior to block coding is the so-called "BLAST" approach in which each transmit antenna is used to transmit a unique symbol stream, with coding and modulation being employed prior to block coding to introduce correlation. An example of an STBC scheme that relies on the block coding structure per se is STTD (space time transmit diversity) where each symbol appears on multiple antennas. A well-known STTD scheme is Alamouti code-based transmission.

With spatial multiplexing (SM), each antenna is used to transmit an independent data stream. There is no correlation introduced by coding and modulation. SM approaches have reduced transmitter complexity, but involve higher receiver complexity. Well known SM schemes include the so-called V-BLAST (vertical BLAST) and D-BLAST (diagonal BLAST) where independent symbol streams are transmitted on each antenna. With SM, independent data streams are transmitted over different antennas, to generate a multiplexing gain. When used with Maximum Likelihood decoding, such a scheme is found to provide good performance.

While traditional STBC exploits both the multiplexing gain as well as diversity gain, spatial multiplexing systems such as V-BLAST provide primarily a multiplexing gain. While the diversity gains levels off with increasing number of antennas, the spatial multiplexing gain increases linearly with the increase in number of antennas.

The benefit of MIMO is significant when the SINRs of the MIMO signals are comparable thereby allowing a full-rank MIMO channel realization. This restricts the number of instances where cooperative MIMO can be successfully employed in systems featuring distributed users having varying SINR conditions.

In systems employing cooperative MIMO, multiple mobile stations cooperatively transmit the data of a single mobile station so as to appear as a MIMO transmission. For example, two mobile stations with one antenna each can transmit one of the mobile stations data. A two antenna base station could then receive the two signals and process them using MIMO techniques. This scheme has some disadvantages. For example, it requires each mobile station's data to be exchanged between the two mobile stations to enable cooperative transmission. Furthermore, the transmission is opportunistic since it is based on access bandwidth in the peer mobile station over and above its own prioritized transmissions. The scheme adds complexity to the mobile station in that it requires an additional transceiver chain to transmit and receive data from its peers. Cooperative MIMO has been shown to provide significant capacity improvements in cellular systems. Since the exchange between two mobile stations is an essential component of cooperative MIMO, the mobile stations need to be conveniently located to exchange the information. Thus, the application of cooperative MIMO is limited to such scenarios.

Infrastructure based 2-hop relaying with the use of cellular spectrum for the relaying function has also been shown to provide significant coverage improvement in cellular systems, resulting in greater ubiquity of data rates as the user moves around the cell. Despite the fact that the bandwidth resource at the base station is now used for both the mobile station-to-relay transmissions and relay-to-base station transmissions, the improved SINR conditions on each of the two hops result in a higher aggregate SINR on the link as a whole and therefore improves the coverage to mobile stations that are further away from the base station.

FIG. 1 shows an example of conventional fixed infrastructure based selective relaying. Shown is a base station 10 having nominal coverage area 12. Fixed infrastructure relays 14,16 are also provided each with respective coverage areas 18,20. It can be seen that the relays serve to increase the coverage area of the base station. Mobile stations such as mobile station 22 that are within the coverage area 12 of the base station 10 can communicate directly with the mobile stations such as mobile stations 24 and 26 that are outside the coverage area of the base station 10, but that are within the coverage area of one of the relays such as relay 14, can communicate by first communicating to the relay 14 and then having their signals relayed from the relay 14 to the base station 10 as illustrated. The result is a multi-hop extension of cellular communication. Various FDD (frequency division duplexing)/TDM (time division multiplexing) approaches have been proposed for dealing with the transmission between the mobile stations and between relays and the base station. In a particular example illustrated at 30, a cellular base station 10, a relay 14 and a mobile station 24 communicate using combined FDD/TDD such that during a first time interval $T_1$ the base station 10 and the relay 14 communicate using uplink and downlink frequencies $f_{UL}$ and $f_{DL}$ respectively while during a second time period $T_2$ the mobile station 24 and the relay 14 communicate using uplink and downlink freqeuncies $f_{DL}$ and $f_{UL}$.

SUMMARY OF THE INVENTION

According to one broad aspect, the invention provides a method comprising: a first wireless node transmitting to a second wireless node; a third wireless node transmitting to the second wireless node; the second wireless node performing MIMO processing on signals received from the first wireless node and the third wireless node; wherein at least one of the first and third wireless nodes is re-transmitting content received from a fourth wireless node.

In some embodiments, the first wireless node is a mobile station; the second wireless node is a base station; the third wireless node is a relay; the fourth wireless node is a mobile station.

In some embodiments, the method further comprises: wherein the first and third wireless nodes re-transmit signals received from fourth and fifth wireless nodes respectively.

In some embodiments, the first and third wireless nodes are relays; the second wireless node is a base station; the fourth and fifth wireless nodes are mobile stations.

In some embodiments, the method further comprises: the first and third wireless nodes receiving signals from fourth and fifth wireless nodes respectively; the first node transmitting content received from the fourth wireless node to the third wireless node, and the third wireless node transmitting content received from the fifth wireless node to the first wireless node; wherein first wireless node transmitting to the second wireless node comprises transmitting a signal based on the content received from the third wireless node and also on the content received from the fourth wireless node; wherein the third wireless node transmitting to the second wireless node comprises transmitting a signal based on the content received from the first wireless node and also based on the content received from the fifth wireless node.

In some embodiments, the first and third nodes transmissions together comprise an STTD (space time transmit diversity) transmission.

In some embodiments, the method further comprises providing a further mode of operation for the fourth node comprising: the fourth node transmitting directly to the second node and to the third node; the third node receiving from the fourth node and re-transmitting to the second node, the third and fourth node's transmissions comprising a cooperative diversity transmission; the second node receiving a direct transmission from the fourth node and the third node's retransmission on multiple antennas and performing diversity combining; the method further comprising: adaptively selecting one of another MIMO mode and cooperative diversity.

In some embodiments, the method further comprises adaptively selecting one of a plurality of MIMO modes by: for each MIMO mode determining a respective metric; selecting between the plurality of MIMO modes based on the metrics.

According to another broad aspect, the invention provides a method comprising: using STBC, transmitting content on N>=2 antennas; transmitting content on M>=1 additional antennas; performing spatial multiplexing processing on signals received on at least N+M antennas to extract components relating to the content transmitted by the N antennas and components relating to the content transmitted by the M antennas; performing STBC processing on the components relating to the content transmitted by the N antennas to recover the content transmitted using STBC.

In some embodiments, the N antennas are on different wireless nodes.

In some embodiments, at least one of the antennas is on a relay relaying content received from another wireless node.

In some embodiments, the method further comprises: adaptively adding and/or removing antennas from the set of N+M antennas used to transmit the content.

According to another broad aspect, the invention provides a system comprising: a MIMO processing node having at least two antennas; a first relay node; the MIMO processing node being adapted to perform MIMO processing on signals received from the first relay node and at least one other node.

In some embodiments, the first relay node is relaying a signal received from other than one received directly from the at least one other node.

In some embodiments, the first relay node is relaying a signal received from the at least one other node.

In some embodiments, said at least one other node comprises a second relay node.

In some embodiments, the first and second relay nodes exchange first and second content received for relaying and transmit respective signals based on both the first and second content to the MIMO processing node, the respective signals collectively comprising an STBC signal.

According to another broad aspect, the invention provides the MIMO processing node comprising: at least N+M antennas adapted to receive signals from transmissions comprising an STBC transmission from N>=2 antennas and transmissions on M>=1 additional antenna; a spatial multiplexing processor for performing spatial multiplexing processing on signals received on at least N+M antennas to extract components relating to the content transmitted by the N antennas and components relating to the content transmitted by the M antennas; an STBC processor for performing processing on the components relating to the content transmitted by the N antennas to recover the content transmitted using STBC.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1A:
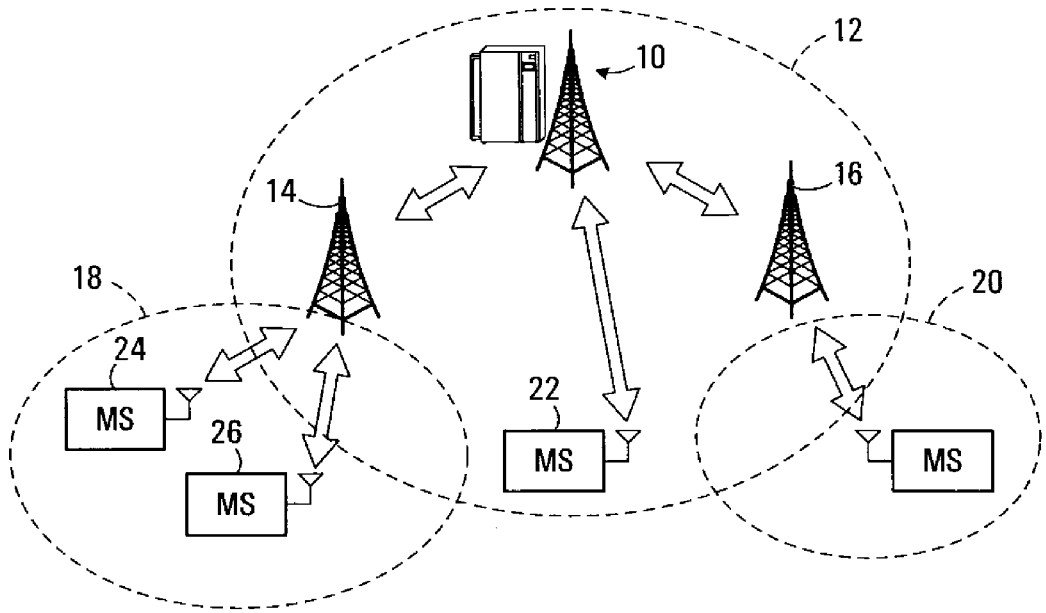
FIGS. 1A and 1B show conventional infrastructure based relay transmission.
Figure 1B:
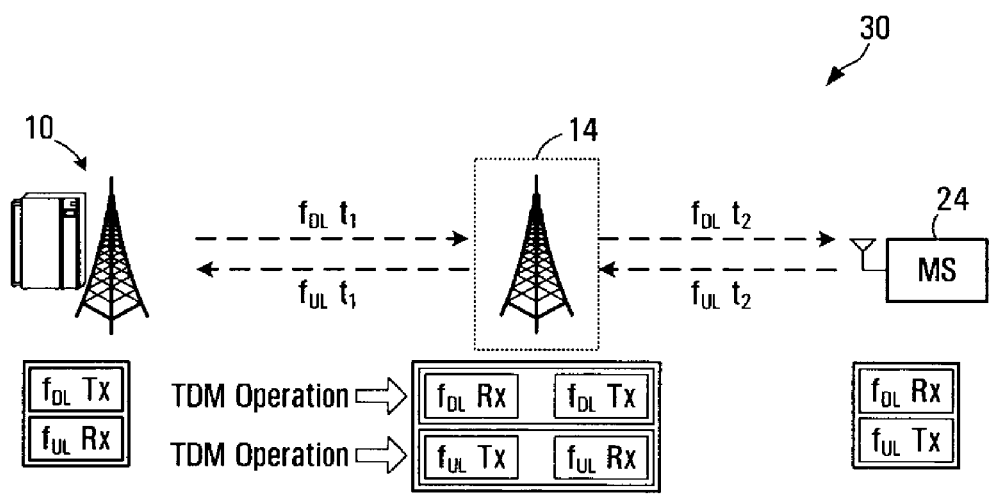
Figure 2A:
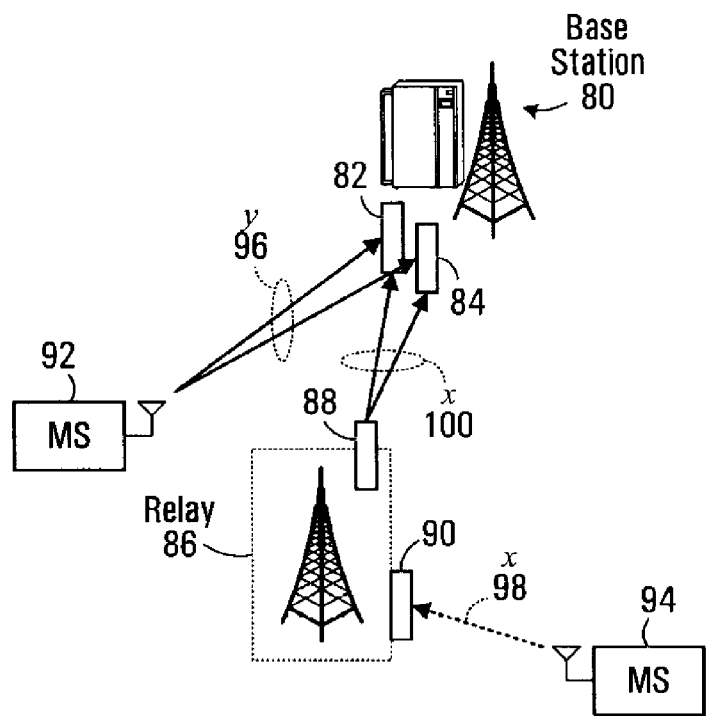
FIG. 2A is a network diagram showing an example of cooperative MIMO using infrastructure based relays as provided by an embodiment of the invention.

Referring now to FIG. 2A, a first example of a MIMO system employing fixed infrastructure based selective relaying will be described. Shown is a fixed infrastructure consisting of a base station 80 having two antennas 82,84 and a relay 86 having two antennas 88,90. Antenna 88 is directed towards the base station 80 whereas antenna 90 is pointed away from the base station to provide additional coverage, either in terms of data rate ubiquity and/or physical coverage area.

In operation, mobile stations that are within the direct coverage area of the base station 80 communicate directly with the base station. An example of this is mobile station 92 whose transmissions 96 are shown going directly from the mobile station 92 to the base station 80. Mobile stations that are within the coverage area of the relay 86 first transmit to the relay 86 and then the relay 86 forwards their communications on to the base station 80. For example, mobile station 94 is shown transmitting a signal 98 that is received by the relay 86 on antenna 90. This is then re-transmitted via antenna 88 as signal 100 towards the base station 80.

The base station 80 then processes the signals received on its two antennas 82,84 using MIMO processing techniques. In the particular example illustrated, what is formed is a virtual 2:2 MIMO spatial multiplexing system using, e.g., V-BLAST mode. In other words, this is analogous to a two antenna transmitter transmitting unique data on each transmitter. Each antenna of the two antenna receiver receives a signal containing transmissions from both transmit antennas. Preferably, when such a MIMO transmission is set up the transmissions are synchronized by base station scheduling. In the illustrated example, this would involve synchronizing the transmissions of the mobile station 92 and the relay 86. Unlike conventional co-operative MIMO, for the embodiment of FIG. 2A there need not be any direct cooperation between mobile station 92 and relay 86.

The base station 80 performs MIMO processing by processing the signals received on antennas 82 and 84 together so as to extract the signals 96 and 100 sent from mobile station 92 and relay 86, respectively. The ideal detection technique for spatial multiplexing is very complex, based on Maximum likelihood decoding. Other suboptimal techniques are also available. However, since the base station processes the received signal, receiver complexity is not an issue. Techniques for performing such MIMO processing are well known in the art and will not be described in further detail here. See for example P. W. Wolniansky, G. J. Foschini, G. D. Golden, R. A. Valenzuela, V-BLAST: An Architecture for Realizing Very High Data Rates Over the Rich-Scattering Wireless Channel, in Proc. ISSSE-98, Pisa, Italy, Sep. 29, 1998.

While the example presented here addresses 2×2 MIMO, the concept may be extended to a larger number (N) of relays and mobile stations to form N×M MIMO channel at the receiver. Since there is no exchange of data between the two transmitting (mobile, relay) stations, there is no requirement for the two stations to be conveniently located within reach of each other.

Figure 3A:
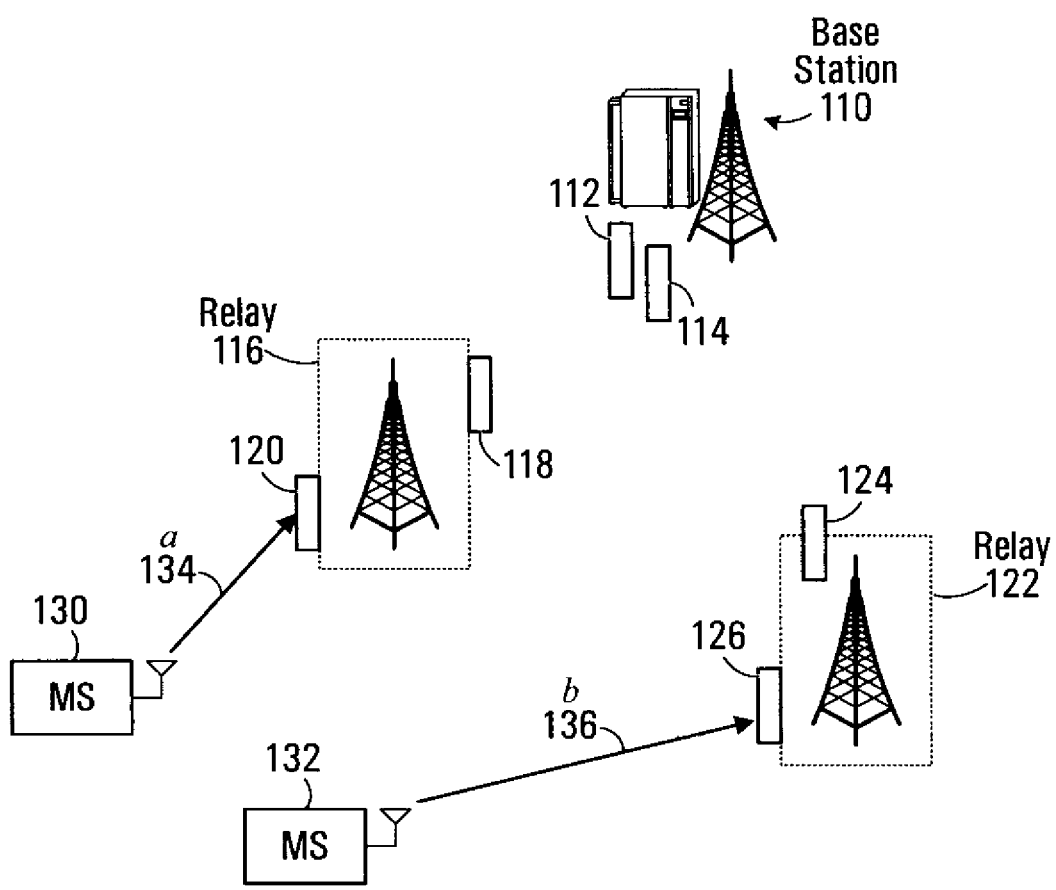
FIGS. 3A and 3B are schematics of example networks showing cooperative MIMO using infrastructure based relays as provided by an embodiment of the invention.
Figure 3B:
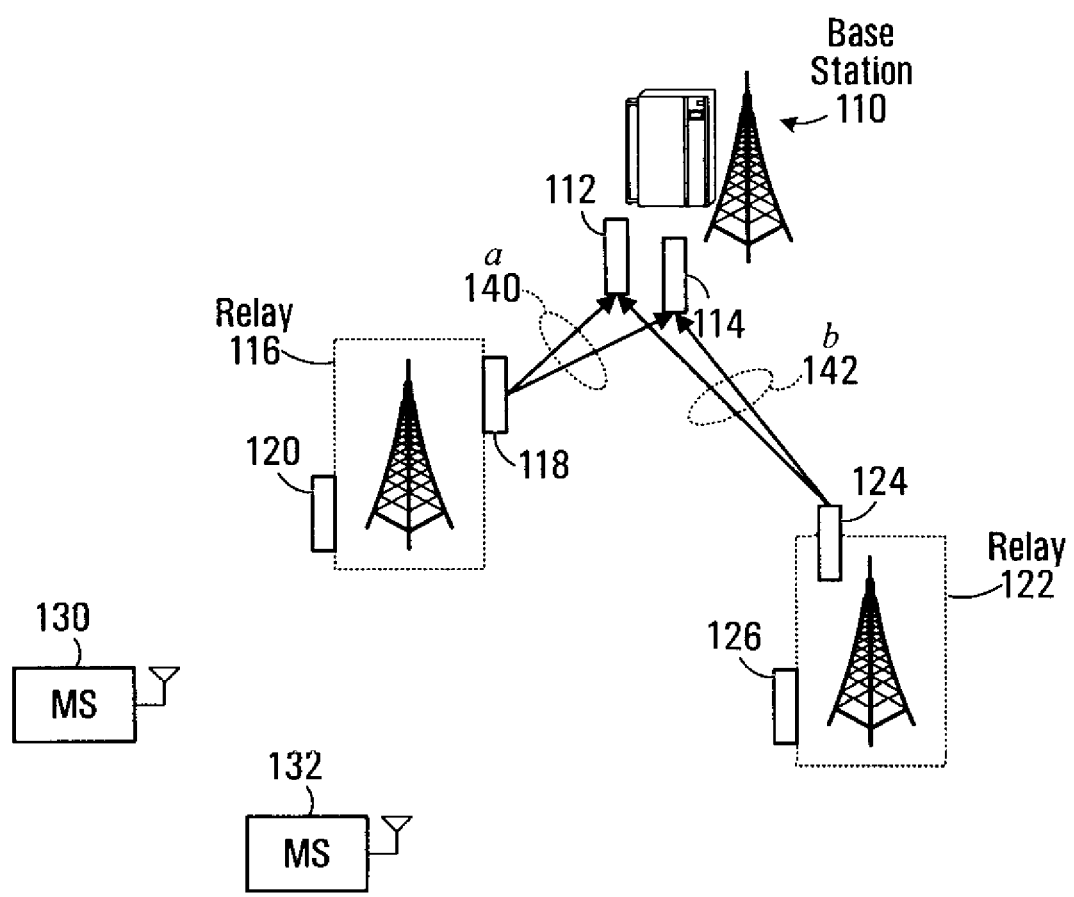

Referring now to FIGS. 3A and 3B, a second example of a MIMO system employing fixed infrastructure based selective relaying will now be described. In both FIGS. 3A and 3B, there is fixed infrastructure consisting of a base station 110 having two antennas 112,114, and a pair of relays 116,122. Relay 116 has two antennas 118,120, and relay 122 has two antennas 124,126. FIG. 3A shows the transmissions 134,136 of a pair of mobile stations 130,132. In the illustrated example, mobile station 130 is within the coverage area of relay 116 whereas mobile station 132 is within the coverage area of relay 122.

The transmissions by the relays 116,122 are shown in FIG. 3B. Relay 116 forwards on the signal received from the mobile station 130 as indicated at 140, and relay 122 forwards on the signal received from mobile station 132 as indicated at 142. The base station 110 receives the two signals on its two antennas 112,114 and the base station performs MIMO processing to recover the transmissions of each of the mobile stations 130,132. Preferably, the transmissions of the relays 116,122 are synchronized, for example using base station scheduling. In the example of FIGS. 3A and 3B, the net effect is a virtual 2:2 MIMO system with V-BLAST mode. Again, any number of relays may participate to form an N×M spatial multiplexing channel where M is the number of Base station antennas. Also, there is no requirement for the relays to have good communication channels between them to exchange data.

Figure 4A:
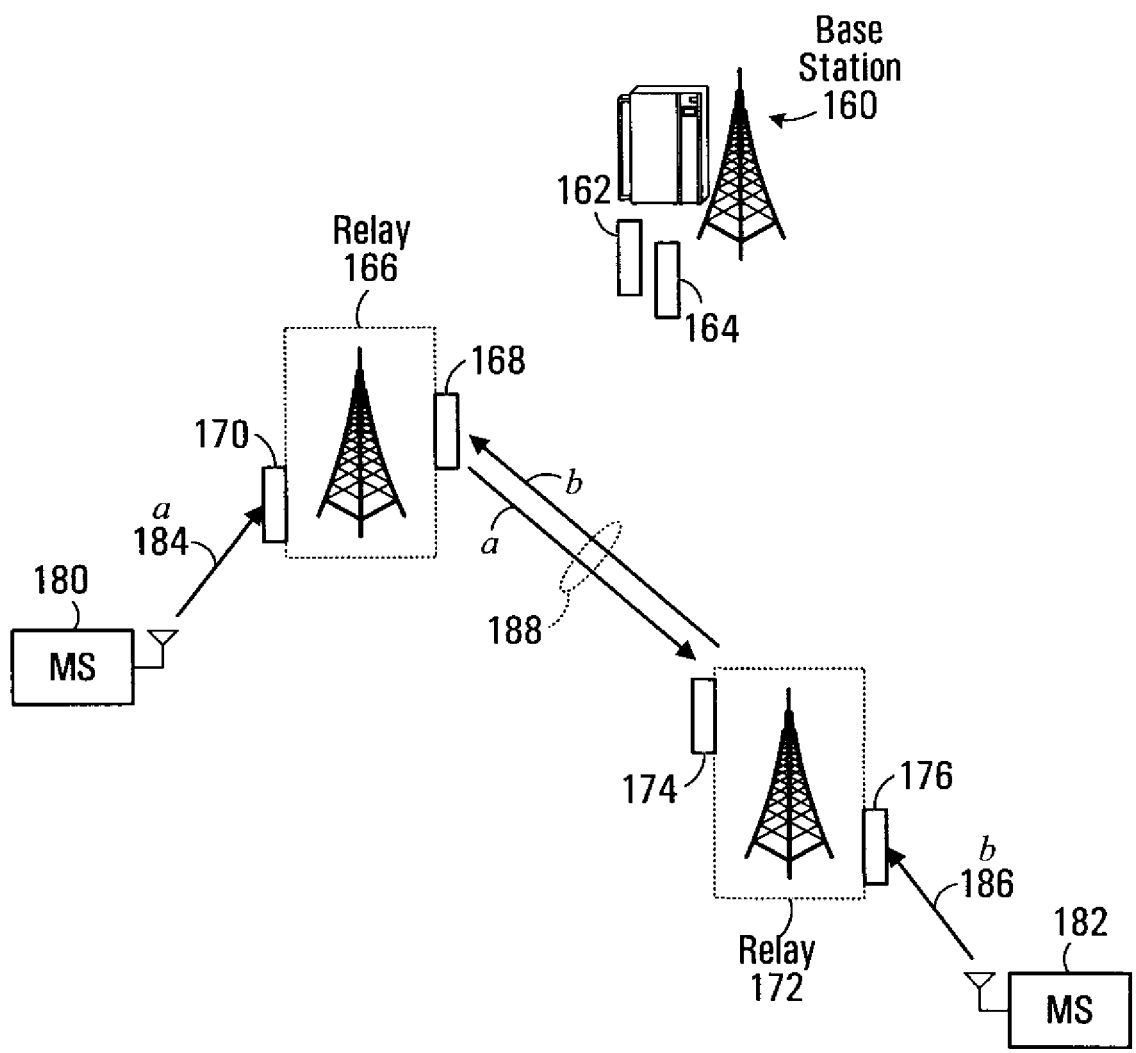
FIGS. 4A through 4C are network diagrams of further examples employing cooperative MIMO with infrastructure based relays provided by an embodiment of the invention.
Figure 4B:
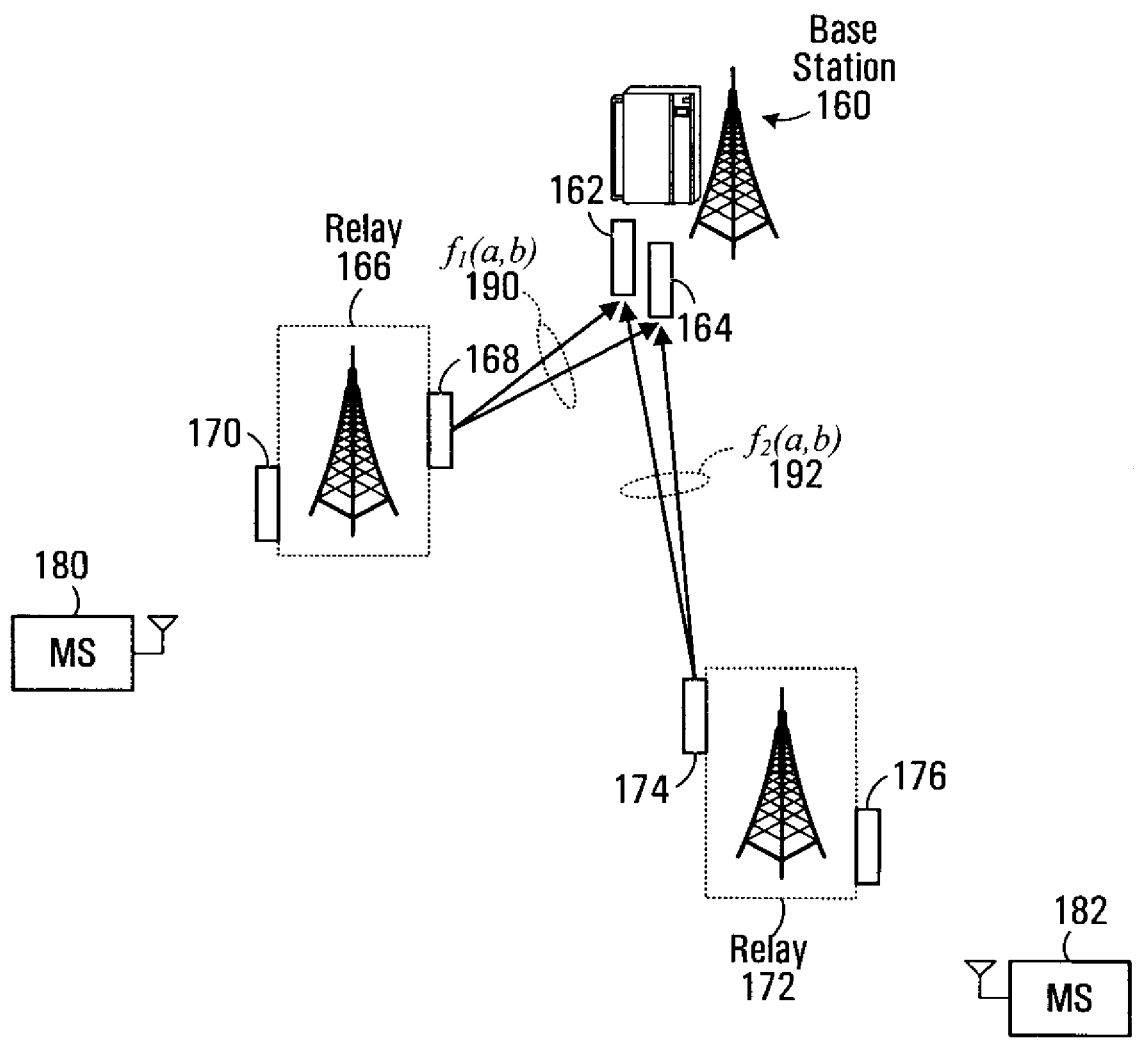

Referring now to FIGS. 4A and 4B, shown is another example of a MIMO system employing fixed infrastructure based selective relaying, where the relays have a communications channel between them. For example, they might be in proximity to each other, such that they can form a transmission channel between themselves for cooperation. In both FIGS. 4A and 4B, fixed infrastructure is shown consisting of a base station 160 having antennas 162,164, and a pair of relays 166,172. Relay 166 has antennas 168,170 and relay 172 has antennas 174,176. Transmissions of a pair of mobile stations 180,182 and between the relays 166,172 are indicated in FIG. 4A. This starts with the mobile station 180 making its transmission 184 that is received by relay 166, and mobile station 182 making its transmission 186 that is received by relay 172. The two relays 166,172 which have a transmission channel between themselves then exchange the information that they receive from the respective mobile stations 180,182. This exchange of information is indicated at 188. At this point, both relays 166,172 have knowledge of the signals received from both mobile stations 180,182. Coding and/or modulation is performed to combine the data/signals.

Using this information, various STBC MIMO transmissions can be made. A first example is indicated in FIG. 4B. In this example, the first relay 166 transmits $f_1(a,b)$ where "a" is the first mobile station's content and "b" is the second mobile station's content. The relay 172 transmits $f_2(a,b)$. The result is virtual 2:2 MIMO, e.g., with BLAST mode.

In another STBC MIMO example, the signals received from the two mobile stations 182,184 are combined using STTD (space-time transmit diversity), e.g., Alamouti coding. For example, if "a" is the signal from mobile station 180 and "b" is signal from mobile station 182, then the transmissions from the two relays 166,172 can be constructed as the first relay 166 transmitting "a" during time interval $T_1$ and transmitting "b" during time interval $T_2$ and the second relay 172 transmitting "−b*" during time interval $T_1$ and "a*" during time interval $T_2$.

Figure 4C:
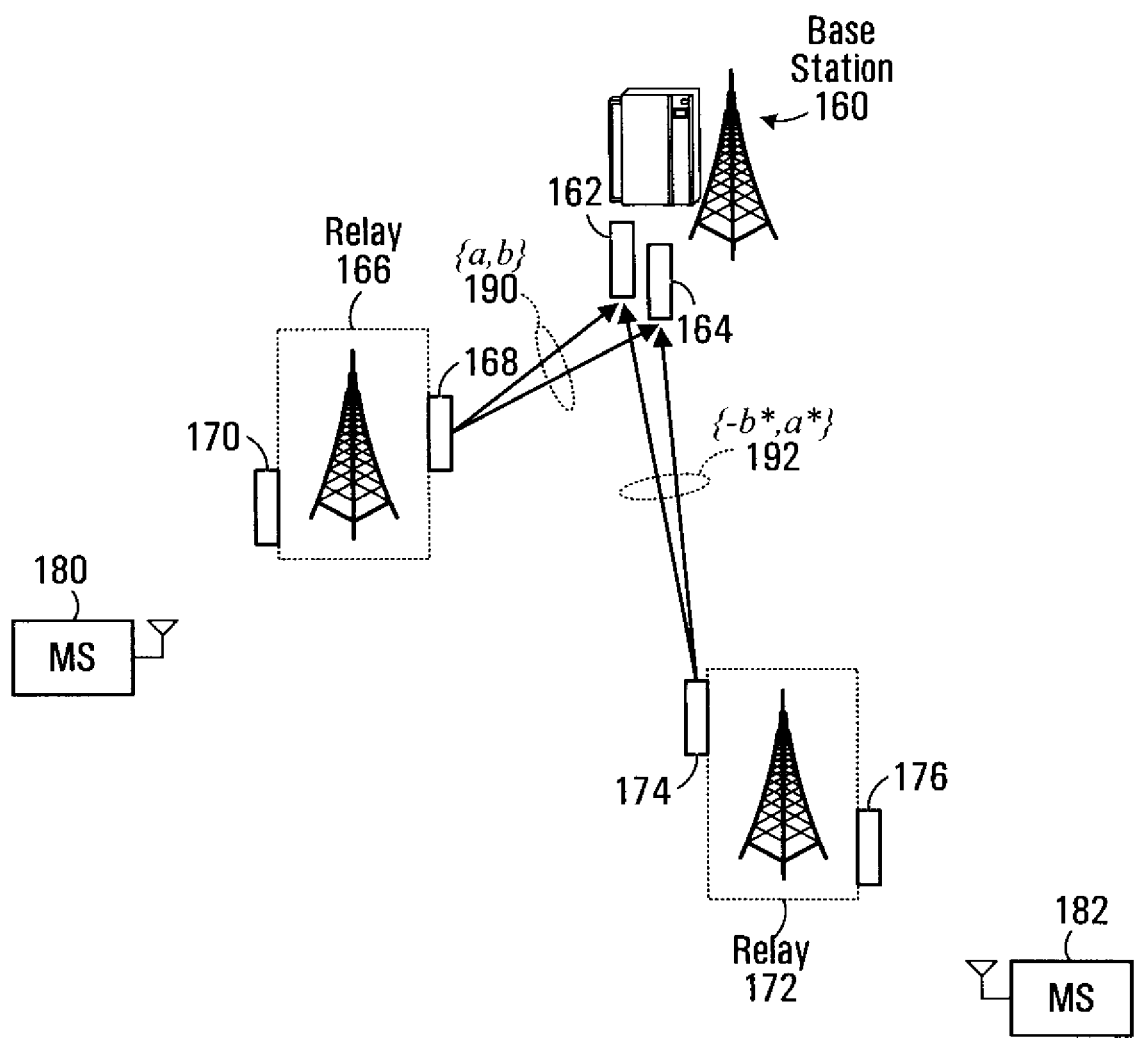

In this example, the first relay transmits {a, b} in sequence over two time intervals $T_1$, $T_2$ and the second relay transmits {−b*, a*} over the same two time intervals, wherein b* and a* are the complex conjugates of b and a, respectively. The base station then performs MIMO processing to recover a and b. This is shown in FIG. 4C. This figure is identical to FIG. 4B except now the first relay 166 is shown transmitting signal 190 consisting of {a, b} in sequence, and the second relay 172 is shown transmitting signal 192 consisting of {−b*, a*} in sequence.

Both techniques illustrated in FIG. 3 (spatial multiplexing) and FIG. 4 (STBC) may be used with different sets of relays, with the base station adapting the receiver algorithm according to whether spatial multiplexing or STBC has been used. Since the relays are static entities, the base station will have the knowledge as to which sets of relays can use STBC and which others can use spatial multiplexing.

Figure 5A:
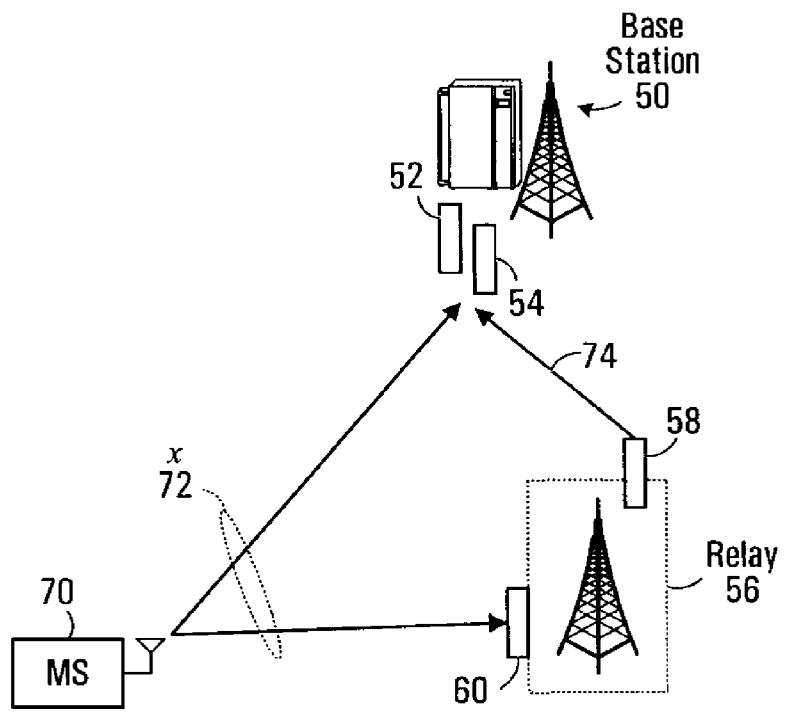
FIG. 5A is a schematic of an example network showing cooperative diversity provided by an embodiment of the invention.

Referring now to FIG. 5A, shown is yet another example of a MIMO system employing fixed infrastructure based selective relaying. This example includes fixed infrastructure consisting of a base station 50 having antennas 52,54 and a relay 56 having antennas 58,60. With this example, a single mobile station 70 is illustrated transmitting its signal 72. The signal is received by the relay 56 and re-transmitted at 74. The base station 50 receives the signal 72 directly from the mobile station 70 and receives the signal 74 from the relay. The transmission that is directly received will be received earlier by the base station 50 and the base station will store soft information determined for this reception. After receiving the newer transmission 74, the base station 50 processes the new relay transmission together with the direct mobile station transmission 72.

Thus, at a first instant, receive antenna diversity takes place at the base station 50 to receive a copy of the mobile station's direct transmission at time $T_1$ on receive antennas 52,54. Shortly later, antenna diversity is used at the base station to receive two copies of the signal transmitted by the relay 56 at time $T_2$ on receive antennas 52,54. These signals are all then combined to recover the original transmission. This can be considered a "cooperative diversity" approach in that the same two antennas are used to provide antenna diversity from the mobile station 70 and from the relay 58, but at different times.

The transmissions 72 and 74 may occur within the same receive processing interval (with some delay on path 74), for example if the relay is an analog relay. In this case, the signal may be processed at the receiver as a 2×2 MIMO signal. Alternatively, the transmissions from 72 and 74 may occur far enough apart to be received during different receive processing intervals. In this case, soft samples from the two time intervals may be processed collectively by soft combining.

Scheduling

The base station is responsible for scheduling transmissions from the mobile stations as well as from the relays to the base station. The base station scheduler treats the relays as terminals for the purpose of scheduling.

Preferably, for MIMO transmissions, the base station schedules the MIMO transmissions in a deterministic manner, based on the scheduling priorities of the different mobile stations.

For the embodiment of FIG. 2A, the following scheduling decisions can be made to synchronize transmissions:
   Mobile station 94 to Relay 86: T1
   Mobile station 92 to base station 80 and Relay 86 to base station 80: T2

For the embodiment of FIG. 3A, the following scheduling decisions can be made in order to synchronize transmissions:
   Mobile station 130 to Relay 116, mobile station 132 to Relay 122: T1
   Relay 116 to base station 110 and Relay 122 to base station 110: T2

For the embodiment of FIG. 4A, the following scheduling decisions can be made to synchronize transmissions:
   Mobile station 180 to Relay 166 and mobile station 182 to Relay 172: T1
   Exchange between Relays 166,172: T2
   Relay 166 to base station 160 and Relay 172 to base station 160: T3

For the embodiment of FIG. 5A, the following scheduling decisions can be made to synchronize transmissions:
   Mobile station 70 to Relay 56 and base station 50: T1
   Relay 56 to base station 50: T2

Various examples of MIMO and cooperative diversity have been described. In another embodiment, an adaptation between cooperative diversity and another MIMO scheme is performed. This involves on a per mobile station and/or relay pair basis comparing MIMO processing gains with diversity gains. An appropriate selection of the better performance can then be made. Adaptation may also be used to switch between any of the MIMO modes described herein, including STBC, SM and cooperative diversity. The particular modes to be adapted between can be selected on an implementation specific basis. The frequency of making this selection might for example depend on the channel update rate.

Preferably, the relays operate on the cellular channel in a TDM fashion, meaning that they do not receive and transmit at the same time. However, other approaches may be employed that allow the relays to transmit and receive at the same time, for example using co-channel separation or frequency division duplexing, or analog relaying.

Figure 6:
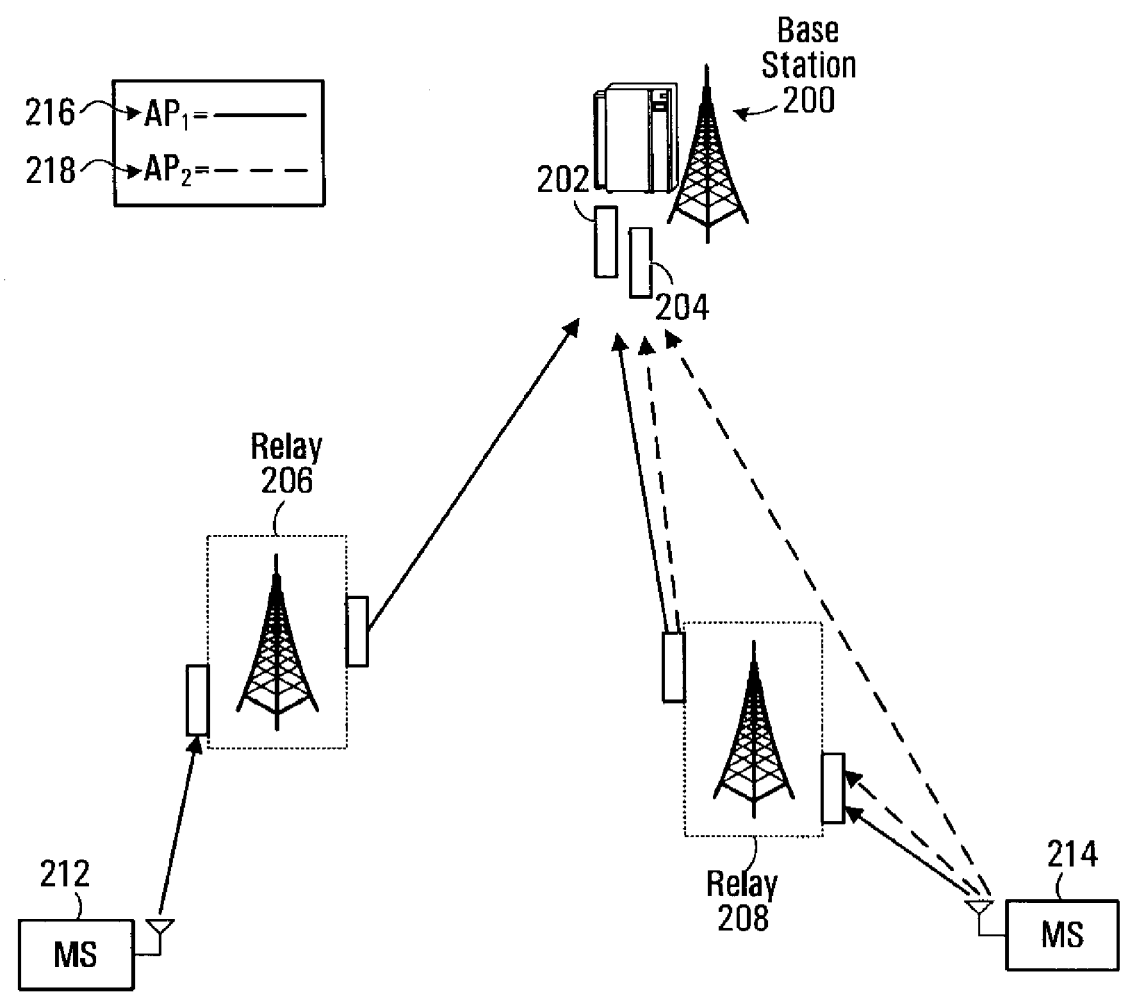
FIG. 6 is a schematic of an example network showing adaptation between cooperative diversity and cooperative MIMO in accordance with an embodiment of the invention.

An example of adapting between two MIMO modes is shown in FIG. 6. In this example, there is a base station 200 with antennas 202,204. Also shown is a pair of relays 206,208 each of which has a pair of antennas as in previous embodiments. The transmissions during the first adaptation period $AP_1$ from the relays 206,208 and a pair of mobile stations 212,214 are indicated at 216. In this case, MIMO is being employed with each mobile station's signals being transmitted via respective relays to the base station 200 where MIMO processing is performed. At a later adaptation period $AP_2$, the signals that are transmitted are indicated at 218. In this case, the second mobile station 214 has a signal that is transmitted via the relay 208, and the signal is also directly received at the base station 204. As such, a cooperative diversity mode is being implemented at $AP_2$. Adaptation can be performed to optimize overall system performance.

Figure 7:
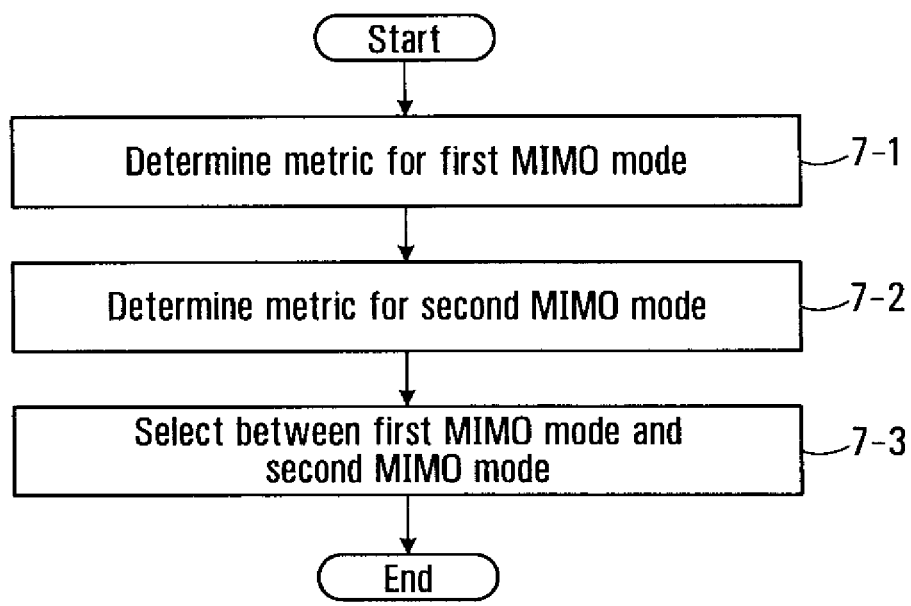
FIG. 7 is a flowchart of an example method of performing adaptation between cooperative MIMO and cooperative diversity provided by an embodiment of the invention.

Referring now to FIG. 7, shown is a flowchart of an example method of adaptive selection between two MIMO modes. At step 7-1, a determination of a metric for a first MIMO mode is calculated. At step 7-2, a metric for a second MIMO mode is calculated. At step 7-3, a selection is made between the first and second MIMO modes based on the two metrics. The metrics can be computed in any appropriate place within the network. The most convenient place to calculate them in a cellular environment would be at the base station. More generally, this method can be used to select between a plurality of MIMO modes.

All of the above embodiments have assumed that the base station has two antennas and therefore allows for 2:2 STBC and/or 2:2 SM implementations. More generally, any appropriate number of antennas can be implemented at the base station, and any MIMO/cooperative diversity schemes supported by such antennas can be implemented. For example, N×M BLAST or N×M V-BLAST could be employed for an N antenna receiver and M transmit antennas where (N, M)>2.

While the embodiments described thus far have focussed on cellular systems, it can be readily seen how these approaches can also be applied to mesh networks. In a mesh network, the functionality of the above described BTS and relay or relay pairs would be implemented by two or three nodes within the mesh network to provide cooperative MIMO and/or cooperative diversity schemes.

Figure 2B:
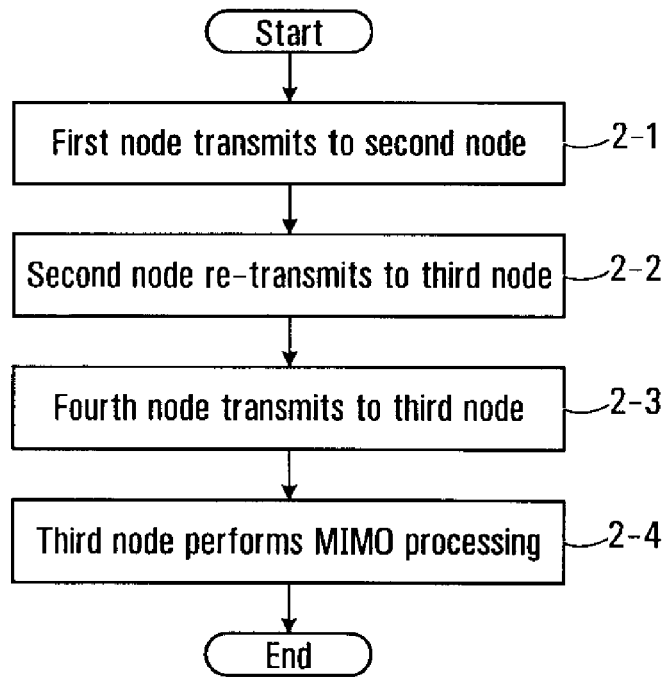
FIG. 2B is a flowchart of an example method of cooperative MIMO provided by an embodiment of the invention.

FIG. 2B is a flowchart of an example MIMO transmission method similar to the method described with reference to FIG. 2A above, but applied in a broader context of four nodes. Any of these nodes may be mobile stations, relays or base stations or mesh networking nodes or other nodes for example. At step 2-1, a first node transmits to a second node. At step 2-2, the second node re-transmits to a third node. At step 2-3, a fourth node transmits to the third node. Finally, at step 2-4, the third node performs MIMO processing of the signals received from the second and fourth nodes.

Figure 3C:
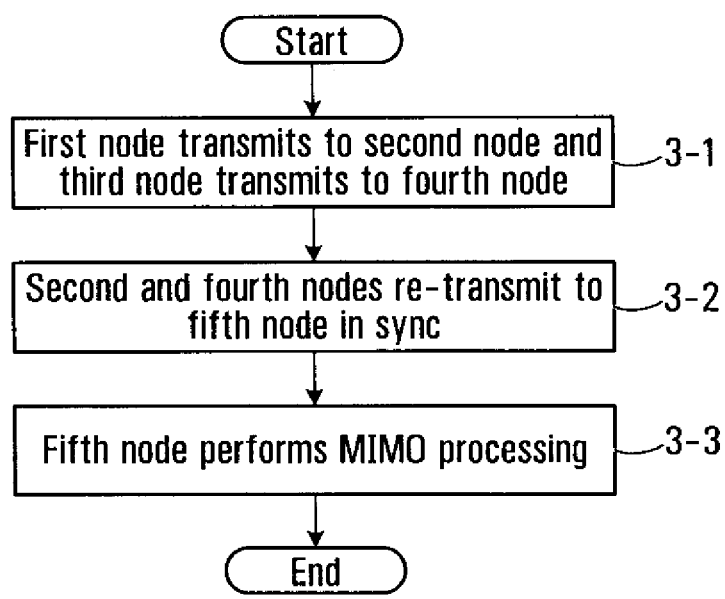
FIG. 3C is a flowchart of an example method of cooperative MIMO provided by an embodiment of the invention.

FIG. 3C is a flowchart of an example method similar to that described above with reference to FIGS. 3A and 3B, but applied in a broader context of five nodes. Any of these nodes may be mobile stations, relays or base stations or mesh networking nodes or other nodes for example. The method begins at step 3-1 with a first node transmitting to a second node and a third node transmitting to a fourth node. At step 3-2, the second and fourth nodes re-transmit to the fifth node in sync. At step 3-3, the fifth node performs MIMO processing.

Figure 4D:
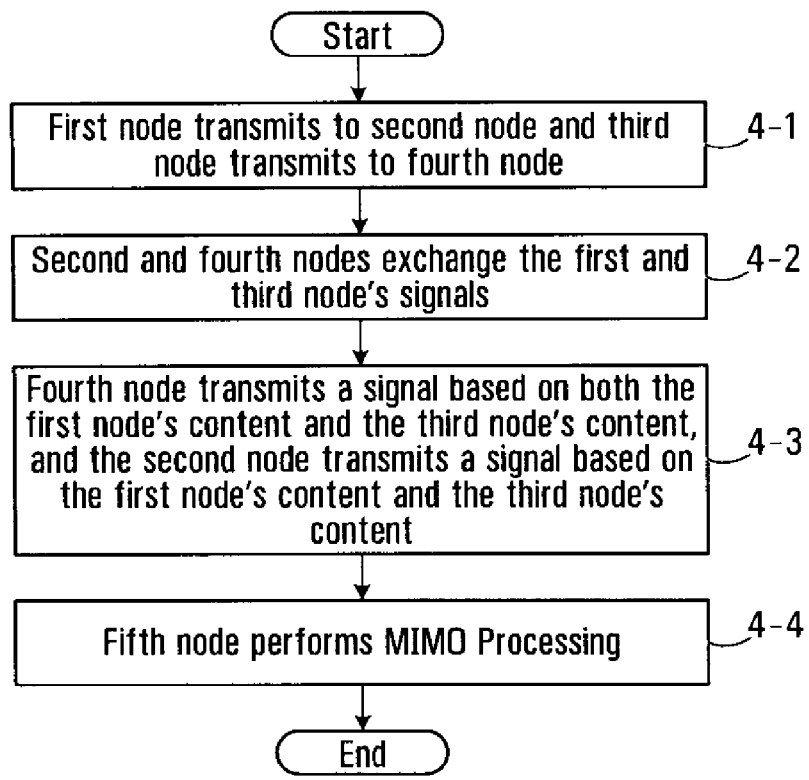
FIGS. 4D and 4E are flowcharts of two further example methods of cooperative MIMO provided by an embodiment of the invention.

Referring now to FIG. 4D shown is a flowchart of an example method of MIMO transmission that is similar to that described above with reference to FIGS. 4A, 4B and 4C, but applied in a broader context of five nodes. Any of these nodes may be mobile stations, relays or base stations or mesh networking nodes or other nodes for example. At step 4-1, a first node transmits to a second node, and a third node transmits to a fourth node. At step 4-2, the second and fourth nodes exchange the first and third node's signals. At step 4-3, the fourth node transmits a signal based on both the first node's content and the third node's content, and the second node transmits a signal based on the first node's content and the third node's content. At step 4-4, the fifth node performs MIMO processing.

Figure 4E:
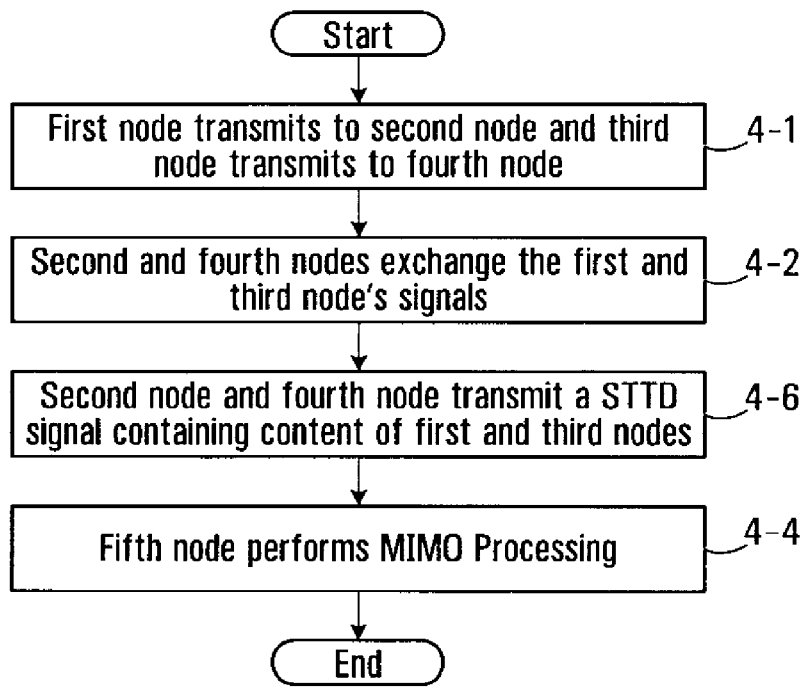

Referring now to FIG. 4E, shown is another method that is a particular example of the method of FIG. 4D. Step 4-6 is implemented as a particular example of step 4-3 of FIG. 4D. This consists of the second and fourth nodes transmitting an STTD signal containing content of both the first and third nodes.

Figure 5B:
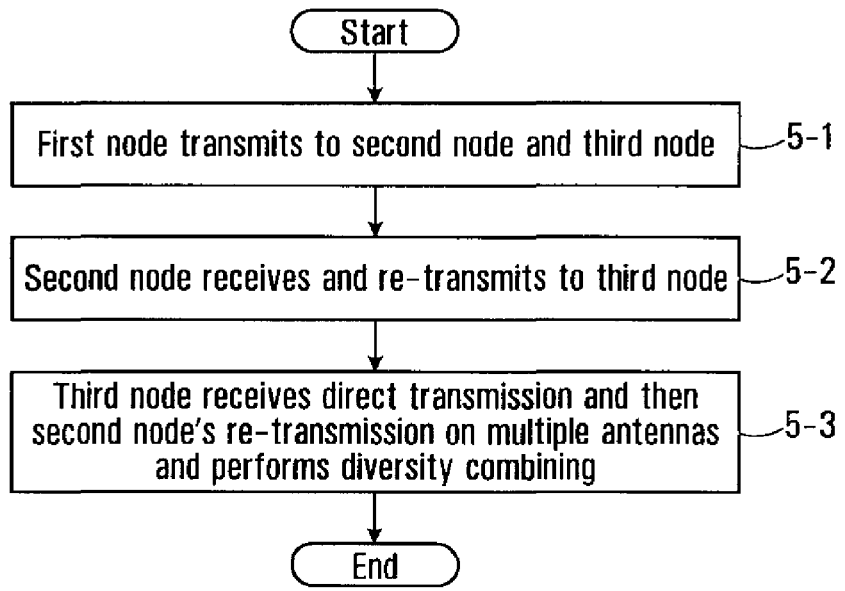
FIG. 5B is a flowchart of an example method of performing cooperative diversity provided by an embodiment of the invention.

Referring now to FIG. 5B, shown is a flowchart of a method of cooperative diversity transmission similar to that described above with reference to FIG. 5A, but applied in a broader context of three nodes. Any of these nodes may be mobile stations, relays or base stations or mesh networking nodes or other nodes for example. At step 5-1, a first node transmits to a second node and a third node. A single signal is transmitted, but this is received by both the second and third nodes. At step 5-2, the second node receives the signal and re-transmits the signal to the third node. At step 5-3, the third node receives the direct transmission and then later receives the second node's re-transmission on multiple antennas. The base station then performs MIMO processing on the signals received from the first node and the second node.

Note that in the above embodiments, the selection of which wireless nodes are to participate in a given cooperative MIMO transmission or cooperative diversity transmission can be statically defined, or dynamically defined. For implementations where one or more of the wireless nodes are mobile stations, the nodes will need to be dynamically defined to accommodate the movement of the mobile node. In such a context, with reference to FIGS. 2A and 2B for example, assuming that the "fourth wireless node" is the mobile station, then what constitutes the first, second and third wireless nodes from that mobile station's perspective can change over time.

In embodiments featuring adaptive selection between cooperative MIMO, and cooperative diversity, the nodes involved in the two methods be the same or may be different.

All of the embodiments have assumed 2×2 MIMO implementations. It is readily apparent how these can be extended to handle MIMO transmissions having larger dimensions.

Figure 8:
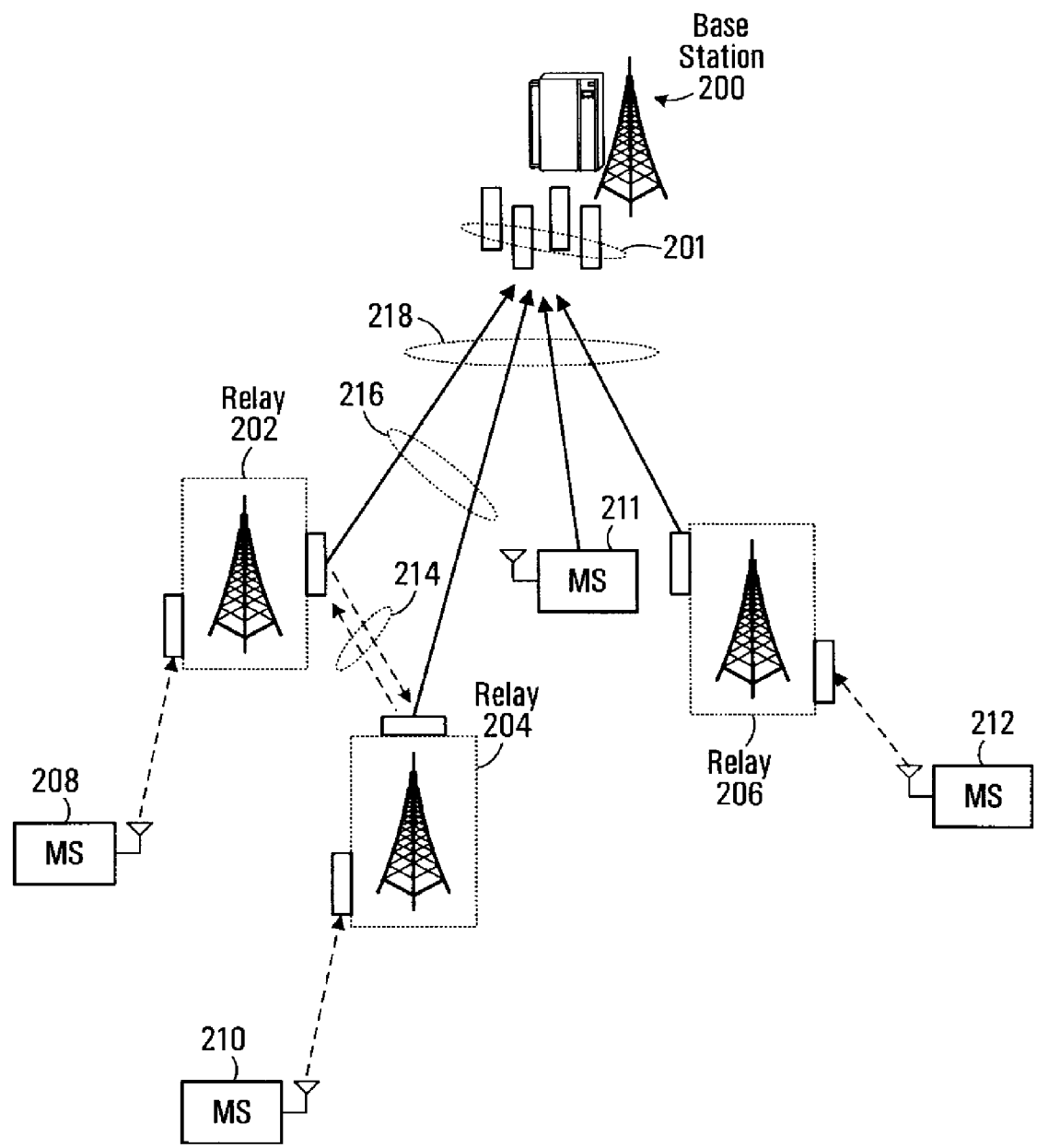
FIG. 8 is a schematic of an example network showing sequential MIMO processing using multiple MIMO nodes.

Referring now to FIG. 8, shown is a network diagram of an example MIMO system in which there is sequential MIMO processing using multiple MIMO modes. Shown is a base station 200 having four antennas 201. Also shown are three relays 202,204,206. Mobile stations are indicated at 208,210, 211,212. At the particular instant depicted, mobile station 208 is sending its transmissions to relay 202 and mobile station 210 is sending its transmissions to relay 204. Relays 202 and 204 exchange content as indicated at 214 and generate an STBC signal 216 that is transmitted towards the base station 200. Any STBC format can be employed. In effect, the two mobile stations 208,210 are having their signals transmitted in a manner analogous to that of FIG. 4 as discussed above. At the same time, mobile station 211 is sending its signal directly to the base station 200, and mobile station 212 sending its signal to the base station 200 via relay 206.

The base station 200 receives on its four antennas 201 and initially performs spatial multiplexing processing. For example, it might perform V-BLAST processing to resolve what was transmitted on each of the four incoming signals. Having performed spatial multiplexing processing, the signals received from the mobile station 211 and the mobile station 212 via the relay 206 will be recovered directly. To recover the transmissions of mobile stations 208,210, further MIMO processing must be performed to extract the respective signals from the STBC signal jointly transmitted by the two relays 202,204.

Thus, it can be seen that for the content ultimately originating from mobile stations 208,210, a sequential MIMO processing approach is employed in the base station 200. First a spatial multiplexing processing is performed to extract streams relevant to the two mobile stations. Then a STBC processing is performed to extract mobile station specific streams. It is common to refer to different streams in spatial multiplexing as "layers" and to the MIMO processing that is performed as layer decomposition. In the above scenarios it is assumed that the overall spatial multiplexing is equivalent to a V-BLAST transmission, but other spatial multiplexing approaches can alternatively be implemented.

Figure 9:
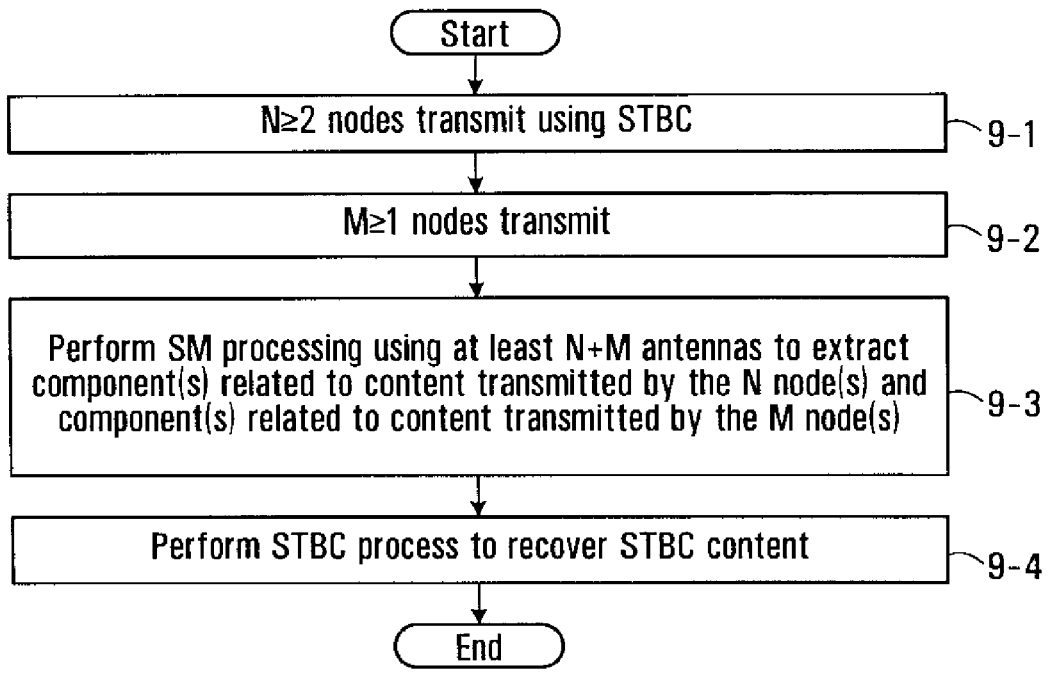
FIG. 9 is a flowchart of another MIMO method provided by an embodiment of the invention.

Referring now to FIG. 9, shown is a flowchart of a method performing MIMO transmission as provided by an embodiment of the invention. At step 9-1, $N \geq 2$ nodes transmit using STBC. At the same time, at step 9-2 $M \geq 1$ other nodes are transmitting. Note that the other nodes may also include combinations of nodes that are transmitting STBC and/or nodes that are transmitting using spatial multiplexing, or only a single other node. At step 9-3, performing spatial multiplexing processing to extract components relating to content transmitted by the N antennas and components relating to content transmitted by the M antennas using at least N+M receive antennas. After this has been done, appropriate subsets of the spatial multiplexing processed symbols are then further processed using STBC processing to recover the STBC content at step 9-4.

Applying numbers for the scenario of FIG. 8, there were N=2 nodes, namely relays 202,204, that were transmitting using STBC. There were M=2 nodes, namely the mobile station 211 and the relay 206 that were transmitting respective streams, effectively amounting to spatial multiplexing. Then, the base station performed spatial multiplexing processing to extract the N+M=4 layers. The layers that were extracted in respect of signals received from the relays 202,204 were then processed using STBC processing to recover that which was transmitted from each of the two mobile stations 208,210.

In an even further generalization, the method of FIG. 9 can be applied in the context of multiple layers being transmitted by a single node. For example, in step 9-1, where there are $N \geq 2$ nodes transmitting STBC, more generally $N \geq 2$ transmit antennas can be transmitting STBC, the antennas being either on one or more different nodes. Similarly, in step 9-2 $M \geq 1$ nodes are said to be transmitting, but more generally $M \geq 1$ antennas are transmitting in addition to the antennas referred to in step 9-1 that are transmitting using STBC.

Figure 10:
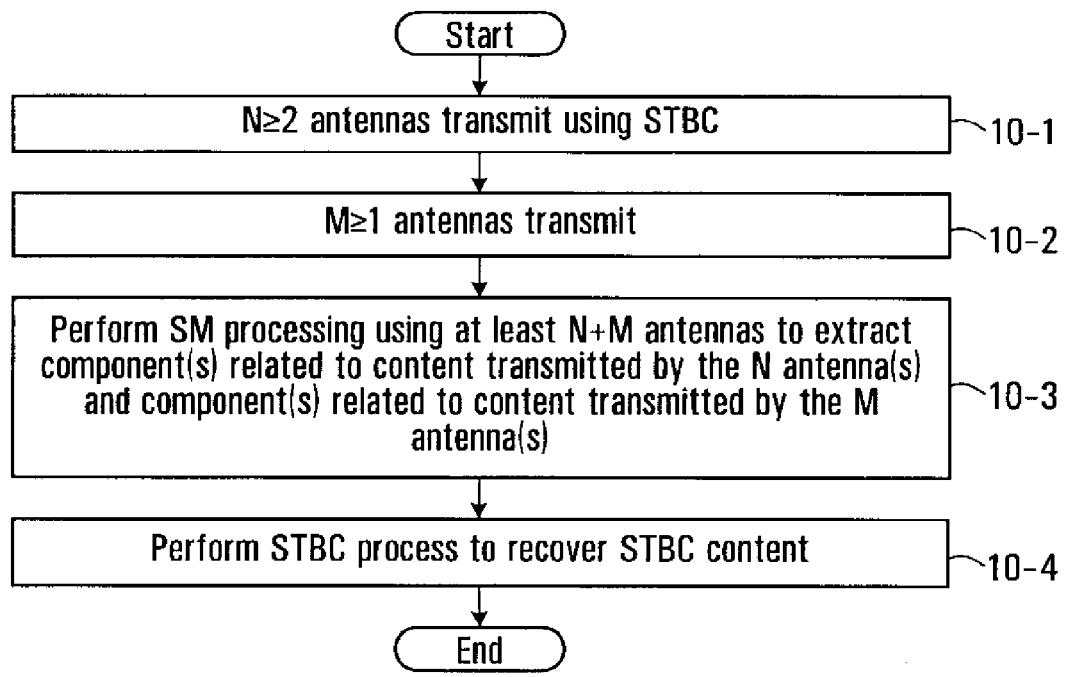
FIG. 10 is a flowchart of another MIMO method provided by an embodiment of the invention.

Referring now to FIG. 10, shown is a flowchart of an example method of performing MIMO transmission as provided by an embodiment of the invention. At step 10-1, $N \geq 2$ antennas transmit using STBC. At the same time, at step 10-2 $M \geq 1$ other antennas are transmitting. Note that the other antennas may also include combinations of antennas that are transmitting STBC and/or antennas that are transmitting using spatial multiplexing, or only a single other antennas. At step 10-3, performing spatial multiplexing components relating to content transmitted by the N antennas and components relating to content transmitted by the M antennas using at least N+M receive antennas. After this has been done, appropriate subsets of the spatial multiplexing processed symbols are then further processed using STBC processing to recover the STBC content at step 10-4.

Applying numbers for the scenario of FIG. 8, there were N=2 antennas, namely relays 202,204, that were transmitting using STBC. There were M=2 antennas, namely the mobile station 210 and the relay 206 that were transmitting respective streams, effectively amounting to spatial multiplexing. Then, the base station performed spatial multiplexing processing to extract the N+M=4 layers. The layers that were extracted in respect of signals received from the relays 202,204 were then processed using STBC processing to recover that which was transmitted from each of the two mobile stations 208,210.

In an even further generalization, the method of FIG. 10 can be applied in the context of multiple layers being transmitted by a single node. For example, in step 10-1, where there are $N \geq 2$ antennas transmitting STBC, more generally $N \geq 2$ transmit antennas can be transmitting STBC, the antennas being either on one or more different antennas. Similarly, in step 10-2 $M \geq 1$ antennas are said to be transmitting, but more generally $M \geq 1$ antennas are transmitting in addition to the antennas referred to in step 10-1 that are transmitting using STBC.

Preferably, at least one of the nodes referred to above in FIG. 9 is a relay in which case the method becomes a special case of one or more of the previously discussed methods.

For the methods of FIGS. 9 and 10, it can be seen how this can be generalized to accommodate multiple STBC groups that would be processed separately after spatial multiplexing processing at the receiver. For example, two antenna STBC transmissions could be received by a four antenna receiver where spatial multiplexing is performed first and then two separate STBC processings are performed.

Furthermore, antennas can be adaptively added and/or removed from a given group of N+M transmit antennas, for example due to movement of mobile nodes, addition of further mobile nodes in a coverage are. In addition, the manner in which the antennas are allocated for STBC transmission can also be adaptively selected.

In a generalization that encompasses both the embodiments of FIGS. 2A and 5A, a system is provided that has a MIMO processing node having at least two antennas. This might be a base station or other wireless node. There is a first relay node (such as relay 86 of FIG. 2A or relay 56 of FIG. 5A). The MIMO processing node performs MIMO processing on signals received from the first relay node and at least one other node. In FIG. 2A, the at least one other node is mobile station 92, and in FIG. 5A, the at least one other node is mobile station 70.

In some embodiments, the first relay node is relaying a signal received from other than one received directly from the at least one other node. This is the case for the example of FIG. 2A where the relay is relaying content received from mobile station 94. In other embodiments, the first relay node is relaying a signal received from the at least one other node. This is the case for FIG. 5A where the relay 56 is relaying content received from mobile station 70 which is the "at least one other node".

In some embodiments, the first and second relay nodes exchange first and second content received for relaying and transmit respective signals based on both the first and second content to the MIMO processing node, the respective signals collectively comprising an STBC signal. The STBC signal can be any of the types discussed herein, or some other STBC format.

Figure 11:
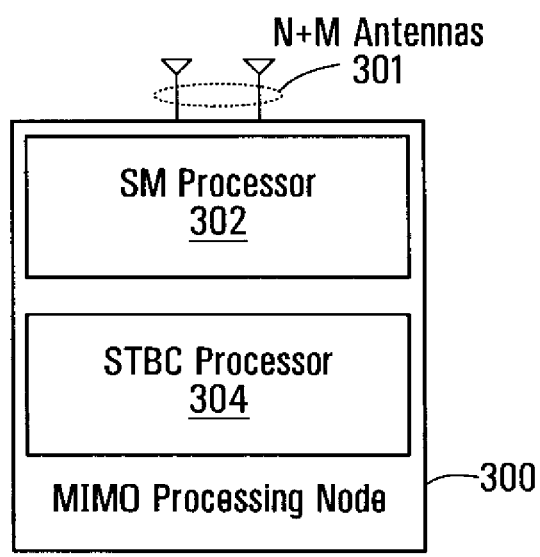
FIG. 11 is a block diagram of an example MIMO processing node provided by an embodiment of the invention.

Another embodiment provides a MIMO processing node that functions as the receiving node for any of the above-described methods. For example, a MIMO processing node suitable for implementing the receive aspects of FIGS. 9 and 10 is depicted in FIG. 11 generally indicated at 300, and can be a base station or some other wireless node. The MIMO processing node 300 has at least N+M antennas 301 adapted to receive signals from transmissions comprising an STBC transmission from $N \geq 2$ antennas and transmissions on $M \geq 1$ additional antenna. There is a spatial multiplexing processor 302 for performing spatial multiplexing processing on signals received on at least N+M antennas to extract components relating to the content transmitted by the N antennas and components relating to the content transmitted by the M antennas. There is also an STBC processor 304 for performing processing on the components relating to the content transmitted by the N antennas to recover the content transmitted using STBC. While shown as physically distinct entities, the SM processor 302 and the STBC processor 304 could alternatively be combined. Any one or suitable combination of hardware, firmware and software can be used to implement the processors.

Some of the embodiments have been described as methods or systems in which multiple nodes are participating. Further embodiments of the invention provide individual wireless nodes that are acting out their roles in one or combination of methods or systems as described herein.

Numerous modifications and variations of the present invention are possible in light of the above teachings. It is therefore to be understood that within the scope of the appended claims, the invention may be practiced otherwise than as specifically described herein.

We claim:
1. A method comprising:
encoding first content using STBC, wherein the first content is content formed from at least two different sources;
transmitting the encoded first content on $N \geq 2$ antennas;

transmitting second content on M>=1 additional antennas, the second content resulting from at least one source that is different than the at least two different sources of the first content;

performing spatial multiplexing processing on signals received on at least N+M antennas to extract components relating to the content transmitted by the N antennas and components relating to the content transmitted by the M antennas;

performing STBC processing on the components relating to the encoded first content transmitted by the N antennas to recover the first content transmitted using STBC.

2. The method of claim 1 wherein the N antennas are on different wireless nodes.

3. The method of claim 1 wherein at least one of the antennas is on a relay node relaying content received from another wireless node.

4. The method of claim 1 further comprising:
adaptively adding and/or removing antennas from the set of N+M antennas used to transmit the first content and the second content.

5. The method of claim 1 further comprising extracting information from the first content corresponding to each of the at least two sources.

6. The method of claim 1, wherein the second content is STBC encoded.

7. The method of claim 6 wherein the second content that is STBC encoded is from at least two different sources.

8. The method of claim 6, further comprising performing STBC processing on the components relating to the second content transmitted by the M antennas to recover the second content transmitted using STBC.

9. The method of claim 1, wherein encoding first content using STBC comprises:
a first relay node having at least one antenna and a second relay node having at least one antenna, the first and second relay nodes exchanging content received from each of a respective source of the at least two sources; and
the first and second relay nodes each encoding content so that collectively the first and second nodes encode the first content for transmission on the N>=2 antennas.

10. A system comprising:
a MIMO processing node having at least two antennas;
a first relay node configured to:
encode first content using STBC, wherein the first content is content formed from at least two different sources; and
transmit the encoded first content on N>=2 antennas;
wherein the MIMO processing node is configured to perform MIMO processing on signals received from the first relay node and at least one other node having M>=1 antennas, the at least one other node configured to transmit second content, the second content resulting from at least one source that is different than the at least two different sources of the first content,
and wherein the MIMO processing node is also configured to perform spatial multiplexing processing on signals received on at least N+M antennas to extract components relating to the content transmitted by the N antennas and components relating to the content transmitted by the M antennas, and wherein the MIMO processing node is further configured to perform STBC processing on the components relating to the encoded first content transmitted by the N antennas to recover the first content transmitted using STBC.

11. The system of claim 10 wherein the first relay node is configured to relay a signal other than one received directly from the at least one other node.

12. The system of claim 10 wherein said at least one other node comprises a second relay node.

13. The system of claim 12 wherein the first and second relay nodes exchange first and second content received for relaying and transmitting respective signals based on both the first and second content to the MIMO processing node, the respective signals collectively comprising an STBC signal.

14. The system of claim 10, wherein the second content is STBC encoded.

15. The system of claim 14 wherein the second content that is STBC encoded is from at least two different sources.

16. The system of claim 14, wherein the MIMO processing node is still further configured to perform STBC processing on the components relating to the second content transmitted by the M antennas to recover the second content transmitted using STBC.

17. A MIMO processing node comprising:
at least N+M antennas configured to receive signals from transmissions comprising an STBC transmission from N>=2 antennas, wherein the STBC transmission is formed from content from at least two different sources, and from transmissions that are generated from at least one source that is different than the at least two different sources used to generate the STBC transmission, on M>=1 additional antennas;
a spatial multiplexing processor for performing spatial multiplexing processing on signals received on at least N+M antennas to extract components relating to first content transmitted by the N antennas and components relating to second content transmitted by the M antennas;
an STBC processor for performing processing on the components relating to the first content transmitted by the N antennas to recover the first content transmitted using STBC.

18. The MIMO processing node of claim 17, which is configured to extract information from the first content transmitted by the N antennas corresponding to each of the at least two different sources.

19. The MIMO processing node of claim 17 wherein the second content is STBC encoded.

20. The MIMO processing node of claim 19 wherein the STBC processor is configured to perform processing on the components relating to the second content transmitted by the M antennas to recover the second content transmitted using STBC.

* * * * *